(12) United States Patent  (10) Patent No.: US 7,526,361 B2
Nakadai et al.  (45) Date of Patent: Apr. 28, 2009

(54) ROBOTICS VISUAL AND AUDITORY SYSTEM

(75) Inventors: Kazuhiro Nakadai, Wako (JP); Hiroshi Okuno, Wako (JP); Hiroaki Kitano, Kawagoe (JP)

(73) Assignee: Honda Motor Co., Ltd., Tokyo (JP)

( * ) Notice: Subject to any disclaimer, the term of this patent is extended or adjusted under 35 U.S.C. 154(b) by 417 days.

(21) Appl. No.: 10/506,167

(22) PCT Filed: Aug. 30, 2002

(86) PCT No.: PCT/JP02/08827

§ 371 (c)(1),
(2), (4) Date: Feb. 9, 2006

(65) Prior Publication Data

US 2006/0241808 A1  Oct. 26, 2006

(30) Foreign Application Priority Data

Mar. 1, 2002 (JP) ............................. 2002-056670

(51) Int. Cl.
*G06F 19/00* (2006.01)
(52) U.S. Cl. ........................ 700/245; 700/258; 700/259; 318/568.1; 901/1
(58) Field of Classification Search ................. 700/245, 700/258, 259; 318/568.1; 901/1
See application file for complete search history.

(56) References Cited

U.S. PATENT DOCUMENTS 7,211,980 B1 * 5/2007 Bruemmer et al. .......... 318/587

(Continued)

FOREIGN PATENT DOCUMENTS

JP  8-174154  7/1996

(Continued)

OTHER PUBLICATIONS

Mitsuishi et al., A tele-micro-surgery system across the Internet with a fixed viewpoint/operation-point, 1995, IEEE, p. 178-185.*

(Continued)

*Primary Examiner*—Khoi H. Tran
*Assistant Examiner*—McDieunel Marc
(74) *Attorney, Agent, or Firm*—Westerman, Hattori, Daniels & Adrian, LLP.

(57) ABSTRACT

Robotics visual and auditory system is provided which is made capable of accurately conducting the sound source localization of a target by associating a visual and an auditory information with respect to a target. It is provided with an audition module (20), a face module (30), a stereo module (37), a motor control module (40), an association module (50) for generating streams by associating events from said each module (20, 30, 37, and 40), and an attention control module (57) for conducting attention control based on the streams generated by the association module (50), and said association module (50) generates an auditory stream (55) and a visual stream (56) from a auditory event (28) from the auditory module (20), a face event (39) from the face module (30), a stereo event (39*a*) from the stereo module (37), and a motor event (48) from the motor control module (40), and an association stream (57) which associates said streams, as well as said audition module (20) collects sub-bands having the interaural phase difference (IPD) or the interaural intensity difference (IID) within the preset range by an active direction pass filter (23*a*) having a pass range which, according to auditory characteristics, becomes minimum in the frontal direction, and larger as the angle becomes wider to the left and right, based on an accurate sound source directional information from the association module (50), and conducts sound source separation by restructuring the wave shape of the sound source.

5 Claims, 12 Drawing Sheets

U.S. PATENT DOCUMENTS

| | | |
|---|---|---|
| 2001/0028719 A1 | 10/2001 | Hayashi |
| 2001/0029416 A1* | 10/2001 | Breed et al. .................... 701/45 |
| 2006/0075422 A1* | 4/2006 | Choi et al. .................... 725/18 |

FOREIGN PATENT DOCUMENTS

| | | |
|---|---|---|
| JP | 11-25277 | 1/1999 |
| JP | 2000-326274 | 11/2000 |
| JP | 2001-177609 | 6/2001 |

OTHER PUBLICATIONS

Mitsuishi et al., A tele-microsurgery system that shows what the user wants to see, 1995, IEEE, p. 237-246.*

Nakadai et al., Real-time speaker localization and speech separation by audio-visual integration, 2002, IEEE, p. 1043-1049.*

Nakadai et al., Robot recognizes three simultaneous speech by active audition, 2003, IEEE, p. 398-405.*

Hiroshi Okuno; IEEE International Conference on Intelligent Robots and Systems, vol. 3, pp. 1402-1409, Nov. 3, 2001. Cited in the PCT search report.

Kazuhiro Nakadai, IEEE International Conference on Intelligent Robots and Systems, vol. 3, pp. 1395-1401, Nov. 3, 2001. Cited in the PCT search report.

A. Sekmen, IEEE International Conference on Systems, Man, and Cybernetics, vol. 2, pp. 888-893, Oct. 11, 2000. Cited in the PCT search report.

Toru Kurata, IEEE International Workshop on Robot and Human Communication; pp. 83-88, Jul. 7, 1995. Cited in the PCT search report.

* cited by examiner

| Evaluation Index | | $R_1$ (dB) | | | $R_2$ (dB) | | | | $R_3$ (dB) | | | |
|---|---|---|---|---|---|---|---|---|---|---|---|---|
| Loud Speaker Direction | | 0° | 30° | 60° | 90° | 0° | 30° | 60° | 90° | 0° | 30° | 60° | 90° |
| Filtering Condition | A | 2.0 | 1.3 | 2.2 | 0.5 | -2.8 | -3.1 | -3.3 | -7.7 | 10.4 | 4.7 | 2.6 | -3.5 |
| | B | 2.2 | 1.4 | 1.6 | 0.8 | -2.1 | -3.4 | -3.8 | -7.3 | 9.1 | 4.6 | 3.4 | -2.8 |
| | D | 2.2 | 1.1 | 2.1 | 0.6 | -2.5 | -4.0 | -3.3 | -7.7 | 10.3 | 6.8 | 2.6 | -3.5 |

(B)

| Evaluation Index | | $R_3$ (dB) | | | | | | | | |
|---|---|---|---|---|---|---|---|---|---|---|
| Loud Speaker Interval | | 30° | | | 60° | | | 90° | | |
| Loud Speaker Direction | | -30° | 0° | 30° | -60° | 0° | 60° | -90° | 0° | -90° |
| Filtering Condition | A | 4.9 | 8.1 | 5.1 | 3.2 | 9.6 | 3.1 | -1.9 | 10.5 | -1.7 |
| | B | 4.8 | 9.1 | 4.7 | 3.7 | 9.2 | 3.8 | -1.7 | 9.1 | -1.3 |
| | D | 5.7 | 7.4 | 5.9 | 3.5 | 9.6 | 3.1 | -2.0 | 9.8 | -2.0 |

ROBOTICS VISUAL AND AUDITORY SYSTEM

TECHNICAL FIELD

The present invention relates to a visual and auditory system for a robot, and in particular, for a robot of human type or animal type.

BACKGROUND ART

For such robots of human and animal types, the attention has in recent years been drawn to active senses of vision and audition.

Active senses are such that, for targeting the sensing apparatuses to deal with a robot's vision and audition to the target, the head, for example, which supports such sensing apparatuses is posture-controlled by drive means.

Here, as for the active vision, at least a camera as a sensing apparatus holds its optical axis toward the target by posture-control using drive means, automatically conducts focusing, zoom-in, zoom-out, and others, thereby takes the pictures of the target, and various studies are being made about it.

On the other hand, as for the active audition, at least a microphone as a sensing apparatus holds its directivity toward the target by posture-control using drive means, and collects sounds from the target. In this case, as a disadvantage of active audition, the microphone picks up the operation noise of the drive means while the drive means operates, thereby relatively big noise is mixed into the sound from the target, and the sound from the target becomes unrecognizable. In order to exclude such disadvantage of active audition, such a method is adopted as to accurately recognize the sound from the target by, for example, determining orientation of the sound source referring to the visual information.

Here, for such active audition in general, Interaural Phase Difference (IPD) and Interaural Intensity Difference (IID) obtained from Head-Related Transfer Function (HRTF) are utilized upon sound source localization, thereby sound source is oriented. However, the sound source localization utilizing said HRTF needs to take into consideration even the sound environment of the room, and the result of sound source localization is largely influenced by the change of room environment. There is also such a problem that complement is required for the value between the observed values due to measurement function. Therefore, it is not suited to the real environment application.

The sound source localization utilizing so called epipolar geometry for vision may be considered not depending on HRTF, but the sound source localization utilizing a conventional epipolar geometry conducts it based on the triangle connecting two ears and the target. However, in such a triangle in the epipolar geometry, one side of the triangle penetrates the head portion, but the real sound from the target does not penetrate the head portion, but rather is transmitted along its surface, hence accurate sound source localization could not be performed.

Further for the sound source separation, there is such a method as to utilize a so called direction pass filter, and select the sub-band having the same IPD as that of a specific direction. However, with such a direction pass filter, the difference in sensitivity by direction and active motion are not considered, thereby the accuracy of sound source localization is lowered except for the front where the sensitivity is good, as well as HRTF is utilized which is a measurement function in prior arts. Therefore, it is hard to correspond to the real environment and the dynamic change in environment, and further there was such a problem that interpolation of HRTF was required for active motion.

DISCLOSURE OF THE INVENTION

With the foregoing taken into account, it is an object of the present invention to provide a robotics visual and auditory system that can effect accurate sound grouping of a target by unifying a visual and an auditory information about the target.

The above-mentioned object can be attained, according to the present invention, by a robotics visual and auditory system characterized in that it comprises: an audition module including at least a pair of microphones for collecting external sounds; a face module including a camera for taking an image in front of a robot; a stereo module for extracting a matter by a stereo camera; a motor control module including a drive motor for horizontally rotating the robot; an association module for generating streams by combining events from said audition, face, stereo, and motor control modules; and an attention control module for effecting attention control on the basis of the streams generated by said association module, whereby: said audition module determines at least one speaker's direction from a sound source separation and localization by grouping based on pitch extraction and harmonic structure on the basis of sound signals from the microphones, and extracts an auditory event, said face module identifies each speaker from his face recognition and localization based on the image taken by the camera, and extracts a face event, said stereo module extracts and orients a longitudinally long matter based on disparity extracted from the image taken by the stereo camera, and extracts a stereo event, said motor control module extracts a motor event based on a rotational position of the drive motor, and thereby said association module determines each speaker's direction based on directional information of sound source localization by the auditory event, face localization by the face event, and matter localization by the stereo event from the auditory, face, stereo, and motor events, and generates auditory, face, and stereo streams by connecting the events in the temporal direction using a Kalman filter, and further generates an association stream by associating said streams, and said attention control module conducts attention control based on said streams, and drive-control the motor on the basis of an action planning result accompanying thereto, and said audition module conducts sound source separation by collecting the sub-bands having Interaural Phase Difference (IPD) and/or Interaural Intensity Difference (IID) within the range of preset width by an active direction pass filter having the pass range which becomes minimum in the front direction in accordance with the auditory characteristics and grows larger as the angle enlarges to the left and right on the basis of accurate sound source directional information from said association module.

In the robotics visual and auditory system in accordance with the present invention, said audition module preferably conducts sound source separation on the basis of sound source localization by an extended auditory epipolar geometry.

In the robotics visual and auditory system in accordance with the present invention, said audition module preferably conducts the sound source separation based on the sound source localization each obtained; by the extended auditory epipolar geometry, with the robot's proper preset frequency as standard, for the frequency below said preset value; by head-related transfer function (HRTF) in all frequency band region; by the extended auditory epipolar geometry in all frequency band region; or by the extended auditory epipolar geometry for the frequency below the preset value, and by the head-related transfer function for the frequency above the preset value.

In the robotics visual and auditory system in accordance with the present invention, said association module determines each speaker's direction, and then generates the auditory, the face, and the stereo streams by connecting the events in the temporal direction using the Kalman filter, and further generates the association stream by associating said streams.

In the robotics visual and auditory system in accordance with the present invention, said audition, face, stereo, motor control, association, and attention control modules are adapted to be mutually connected through network, and relatively high speed network is used for the communication of the events and streams with large data volume in particular.

According to the above-mentioned aspect, the audition module obtains the direction of each sound source by conducting pitch extraction utilizing harmonic wave structure from the sounds collected by the microphones from external targets, and extracts the auditory event by determining each speaker's direction. Also, the face module detects and identifies each speaker by the face recognition and localization of each speaker by pattern recognition from the image taken by the camera, and extracts each speaker's face event. And the stereo module extracts and orients a longitudinally long matter on the basis of the disparity extracted from the image taken by the stereo camera, and extracts the stereo event. Further, the motor control module extracts the motor event by detecting the robot's direction on the basis of the rotational position of the drive motor rotating said robot horizontally.

Here, said event is intended to refer to the fact that there is detected a sound or a face at each point of time, or to the state in which the drive motor is rotated, and said stream is intended to refer to the event so connected as to be continuous time-wise by, for example, the Kalman filter or the like, while effecting error correction processing. Also, the terms "visual module" and "visual stream" as used in the present specification are the concepts including face module, face stream, and stereo module, and stereo stream.

Here, the association module determines each speaker's direction by the directional information of the sound source localization of the auditory event, face localization of the face event, and matter localization of the stereo event, based on the auditory, face, stereo, and motor events thus extracted respectively, thereby generates each speaker's auditory, face, and stereo (visual) streams, and further generates the association stream by associating said streams. In this case, the association module determines each speaker's direction on the basis of the sound source localization of the auditory event, the face localization of the face event, and the matter localization of the stereo event, that is, the directional information of audition and vision, thereby generates the association stream with reference to each speaker's determined direction.

And the attention control module effects the attention control based on said streams, and drive control of the motor based on the planning result of the action accompanying thereto. Attention is intended to mean to "pay attention to" the object speaker by a robot auditorily and/or visually, and attention control is intended to mean for a robot to pay attention to said speaker by changing its direction by the motor control module.

And the attention control module controls the drive motor of the motor control module based on said planning, thereby turns the robot's direction to the object speaker. Thus, by facing in front the object speaker by the robot, the audition module can accurately collect and orient said speaker's voice by the microphones in front where the sensitivity is high, and the face module can take said speaker's image well by the camera.

Consequently, by determining each speaker's direction based on the directional information such as sound source localization of the auditory stream and speaker localization of a visual stream (face and stereo streams) by associating said audition, visual (face and stereo), and motor control modules with the association and attention control modules, the robot's audition and vision mutually complement their respective ambiguities, thereby so called robustness is improved, and each speaker can be accurately recognized in case of a plurality of speakers. Also in case, for example, that either one of auditory and visual streams (face and stereo streams) lacks, since the attention control module can track the object speaker based only on the remaining visual stream (face or stereo stream) or the auditory stream, accurately grasping the direction of the target and controlling the motor control module can be effected.

Here, the audition module can effect more accurate sound source localization by referring to the association stream from the association module, and by sound source localization with the face and the stereo streams from the face and the stereo modules taken into consideration. And said audition module is adapted to effect sound source separation by collecting the sub-bands having Interaural Phase Difference (IPD) or Interaural Intensity Difference (IID) within the range of preset width, and by reconstructing the wave of the sound source, by the active direction pass filter having the pass range which becomes minimum in the front direction in accordance with the auditory characteristics and grows larger as the angle enlarges to the left and right on the basis of accurate sound source directional information from said association module, thereby more accurate sound source separation is possible by adjusting the pass range, that is, the sensitivity depending on said auditory characteristics with the difference in sensitivity depending on direction taken into consideration.

In case that said audition module effects sound source separation on the basis of sound source localization by the extended auditory epipolar geometry, it effects sound source localization by the extended auditory epipolar geometry along the surface of the head portion, referring to the association stream from the association module, thereby more accurate sound source separation by an auditory epipolar geometry can be effected based on the real distance from the sound source to the left and the right microphones provided to the robot's both ear portions, by applying the auditory epipolar geometry with the shape of the robot's cladding taken into consideration.

In case that said audition module effects, with the robot's proper preset frequency as the standard, sound source separation on the basis of sound source localization obtained, respectively, either by the extended auditory epipolar geometry in the range lower than said preset frequency, by the Head-Related Transfer Function (HRTF) over the whole frequency band range, by the extended auditory epipolar geometry over the whole frequency band range, or by the extended auditory epipolar geometry in the range lower than said preset frequency and the Head-Related Transfer Function above said preset frequency, accurate sound source separation can be effected according to the actual environment at that time.

In case that said association module determines each speaker's direction, and then generates the auditory and the visual streams, that is the face, and the stereo streams, by connecting the events in the temporal direction using the Kalman filter, and further generates the association stream by associating said streams, more accurate stream can be generated by using the Kalman filter.

In case that said audition, face, stereo, motor control, association, and attention control modules are mutually connected through network, and relatively high speed network is used for the communication of the events and streams with large data volume in particular, real time ability and scalability can be improved by transmitting large volume data by relatively high speed network.

BRIEF DESCRIPTION OF FIGURES

The present invention will better be understood from the following detailed description and the drawings attached hereto showing certain illustrative forms of embodiment of the present invention. In this connection, it should be noted that such forms of embodiment illustrated in the accompanying drawings hereof are intended in no way to limit the present invention but to facilitate an explanation and an understanding thereof. In the figures.

FIG. 11(A) is a figure showing two simultaneous voices in Experiment 3 of the robotics visual and auditory system shown in FIG. 4, and FIG. 11(B) is a figure showing an evaluation of sound source separation in case of three simultaneous voices.

BEST MODES FOR CARRYING OUT THE INVENTION

Hereinafter, certain forms of embodiment of the present invention will be described in detail with reference to the figures.

Figure 1:
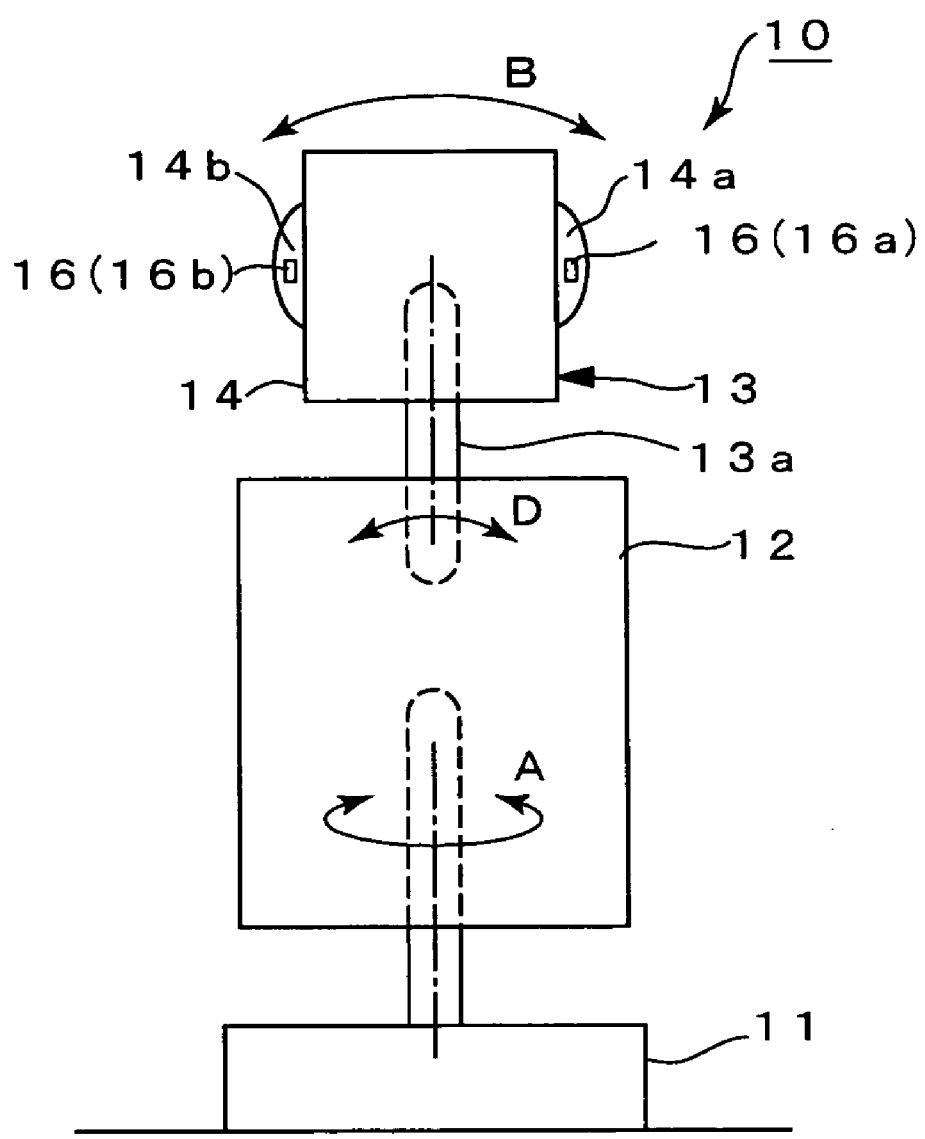
FIG. 1 is a front elevational view illustrating an appearance of a humanoid robot incorporating a robot visual and auditory apparatus that represents the first form of embodiment of the present invention.
Figure 2:
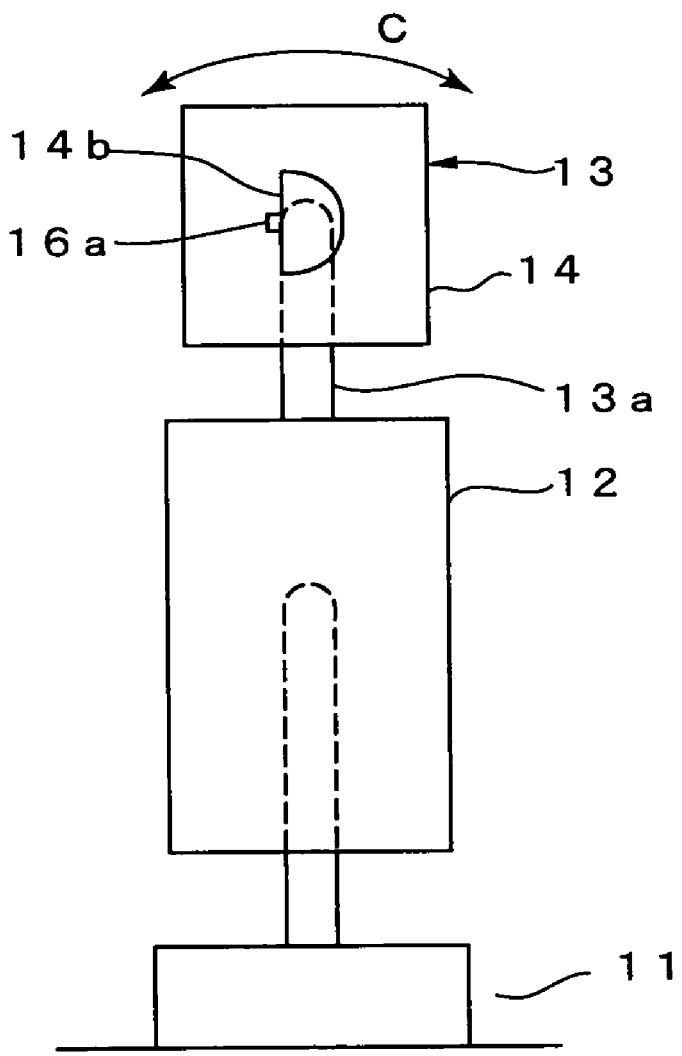
FIG. 2 is a side elevational view of the humanoid robot shown in FIG. 1.

FIG. 1 and FIG. 2 are the figures illustrating the overall makeup of an experimental human type robot incorporating a robotics visual and auditory system according to the present invention in one form of embodiment thereof.

In FIG. 1, a robot 10 is made up as a robot with four degrees of freedom (4DOFs) including a base 11, a body portion 12 supported on the base 11 so as to be rotatable uniaxially about a vertical axis, and a head portion 13 supported on the body portion 12 so as to be capable of swinging triaxially (about a vertical axis, a lateral horizontal axis extending from right to left or vice versa and a longitudinal horizontal axis extending from front to rear or vice versa). Said base 11 may either be disposed in position or arranged operable as leg portions of the robot. Alternatively, the base 11 may be mounted on a movable carriage or the like. Said body portion 12 is supported rotatably relative to the base 11 so as to turn about the vertical axis as indicated by the arrow A in FIG. 1, and it is rotationally driven by a drive means not shown in the figure and is covered with a sound insulating cladding as illustrated.

Said head portion 13 is supported from the body portion 12 by means of a connecting member 13a and is made capable of swinging relative to said connecting member 13a, about the longitudinal horizontal axis as indicated by the arrow B in FIG. 1 and also about the lateral horizontal axis as indicated by the arrow C in FIG. 2. And, said connecting member 13a is supported capable of swinging about the longitudinal horizontal axis relative to said body portion 12, as indicated by the arrow D in FIG. 1, and is rotationally driven in the directions of respective arrows A, B, C, and D by respective drive means not shown in the figure.

Figure 3:
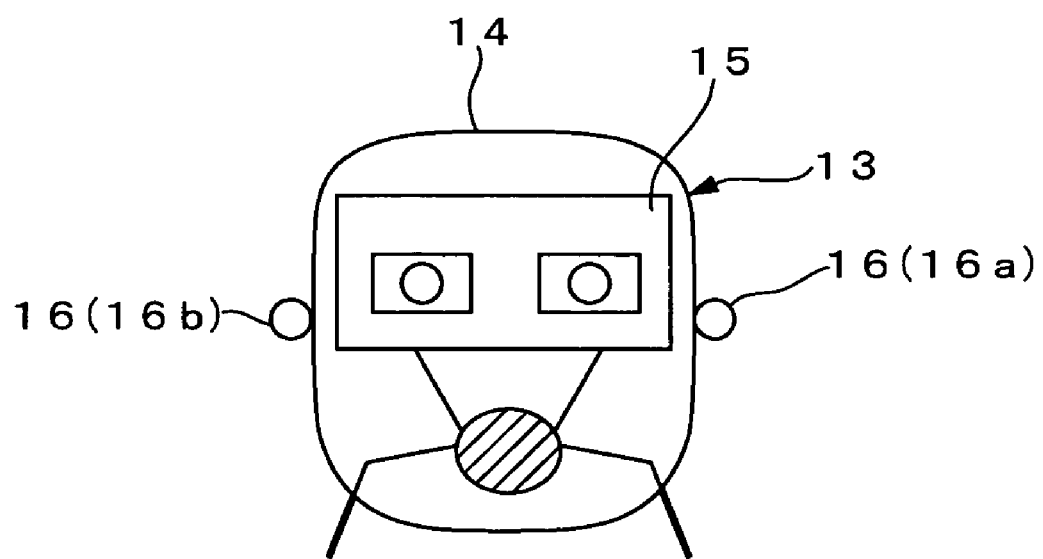
FIG. 3 is an enlarged view diagrammatically illustrating a makeup of the head portion of the humanoid robot shown in FIG. 1.

Here, said head portion 13 as shown in FIG. 3 is covered over its entire surface with a sound insulating cladding 14 and at the same time is provided at its front side with a camera 15 as the vision means in charge of robot's vision and at its both sides with a pair of microphones 16 (16a and 16b) as the auditory means in charge of robot's audition or hearing. Here, said microphones 16 may be provided in other positions of the head portion 13, or at the body portion 12 or others, not limited on both sides of the head portion 13. Said cladding 14 is made, for example, of such sound absorbing plastics as urethane resin or others, and is made up as to effect sound proofing inside the head portion 13 by almost completely closing the inside of the head portion 13. Here also, the cladding of the body portion 12 is made likewise of the sound absorbing plastics. Said camera 15 may be of a known design, and thus any commercially available camera having three DOFs (degrees of freedom): panning, tilting and zooming functions is applicable here. Said camera 15 is so designed as capable of transmitting stereo images synchronously.

Said microphones 16 are attached to the head portion 13 so that in its side faces they have their directivity oriented towards its front. Here, the right and the left hand side microphones 16a and 16b as the microphones 16 as will be apparent from FIGS. 1 and 2 are mounted inside of, and thereby received in, stepped bulge protuberances 14a and 14b, respectively, of the cladding 14 with their stepped faces having one or more openings and facing to the front at both sides and are thus arranged to collect through these openings a sound arriving from the front. And, at the same time they are suitably insulated from sounds interior of the cladding 14 so as not to pick up such sounds to an extent possible. This makes up the microphones 16a and 16b as what is called a binaural microphone. It should be further noted that the stepped bulge protuberances 14a and 14b in the areas where the microphones 16a and 16b are mounted may be dome-shaped so as to protrude rearward, or shaped to resemble human outer ears.

Figure 4:
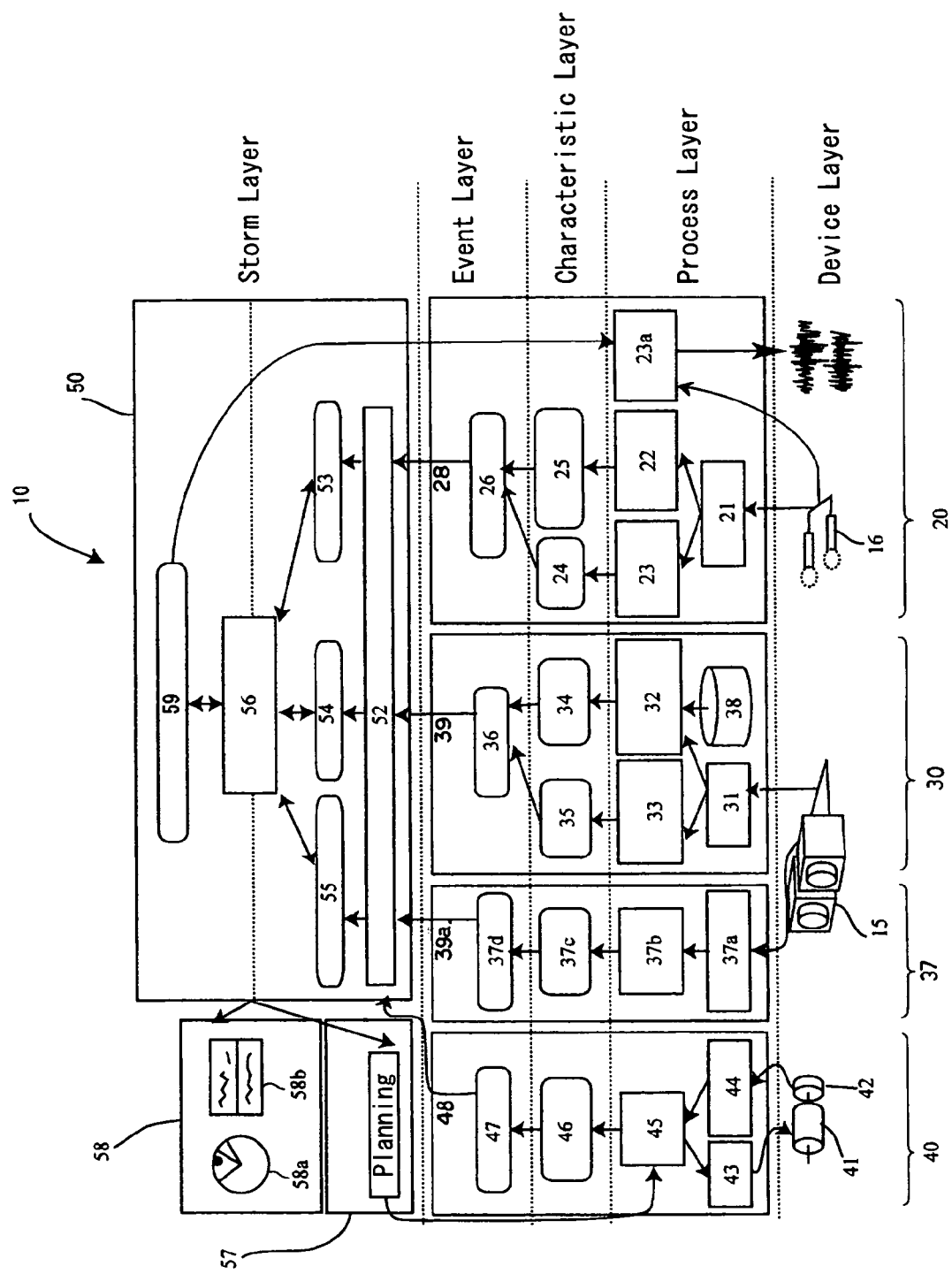
FIG. 4 is a block diagram illustrating an electrical makeup of a robotics visual and auditory system for the humanoid robot shown in FIG. 1.

FIG. 4 shows the electrical makeup of a robotics visual and auditory system including said camera 15 and microphones 16. In FIG. 4, the robotics visual and auditory system comprises an audition module 20, a visual module, that is, a face module 30 and a stereo module 37, a motor control module 40, and an association module 50. Said association module 50 is made as a server, and other modules, that is, the audition module 20, the face module 30, the stereo module 37, and the motor control module 40 are respectively made as a client, and act mutually asynchronously. Here, said server and respective clients are made up of, for example, personal computers, and mutually LAN connected via, for example, the network of 100Base-T or others (not shown in the figure) by, for example, TCP/IP protocol. In this case, the high speed network for the communication of large data volume events and streams, and the medium speed network for the control communication of time synchronization or others are used separately. Thus, the real time ability and scalability of the whole robot are improved.

Said respective modules 20, 30, 37, 40, and 50 are distributed stepwise, and made up in order from the bottom the device layer, the process layer, the characteristic layer, and the event layer.

First of all, the audition module 20 will be explained.

Said audition module 20 comprises microphones 16 as the device layer, a peak extracting section 21, a sound source orienting section 22, a sound source separating section 23 and an active direction pass filter 23a as the process layer, a pitch 24 and a sound source horizontal direction 25 as the characteristic layer (data), and an auditory event generator 26 as the event layer.

Hereafter, the action of the audition module 20 will be explained concretely with reference to FIG. 5.

Figure 5:
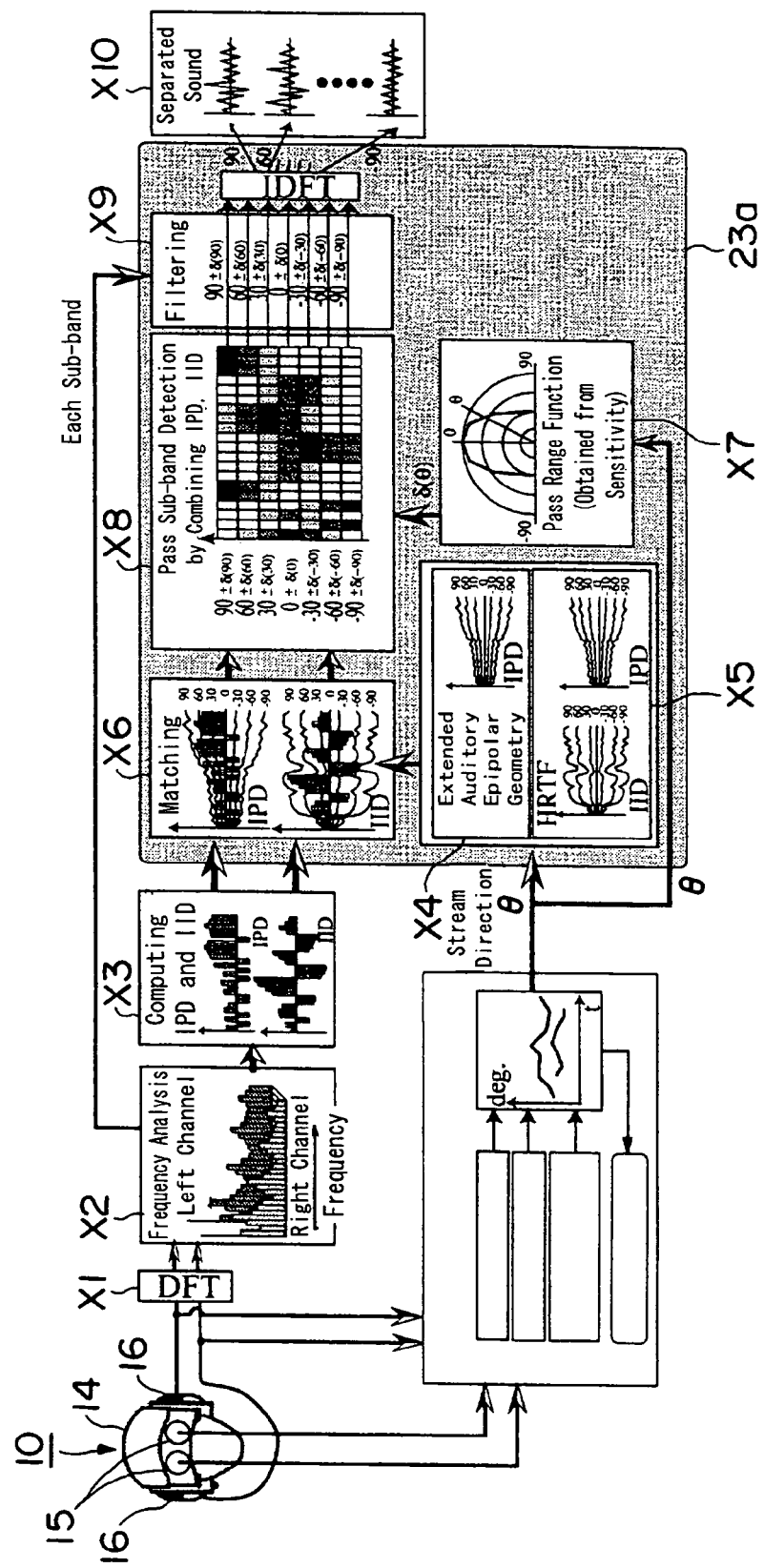
FIG. 5 is a diagram illustrating an action of an audition module in the robotics visual and auditory system shown in FIG. 4.

In FIG. 5, the audition module 20 analyses frequency of the sound signal from the microphone 16 sampled out by, for example, 48 kHz, 16 bits by DFT, as shown by the mark X1, and produces a spectrum for the left and the right channels each as shown by the mark X2. And the audition module 20 extracts a series of peaks by the peak extracting section 21 for the left and the right channels each, and makes a pair of identical or similar peaks by the left and the right channels. Here, since the power exceeds the threshold value, and is a local peak, and the peak extraction cuts the low frequency noise and the high frequency band region with low power, it is conducted by using the band pass filter transmitting the data only under the condition of, for example, the frequency between 90 Hz and 3 kHz. Said threshold value is defined by measuring the background noise, and further adding the sensitivity parameter, for example, 10 dB.

And the audition module 20, utilizing the fact that each peak has harmonic structure, extracts the local peaks having harmonic structure in the order from low frequency, and groups the sound signal of each sound source from the mixed sound from each sound source by the sound source separating section 23 with the assembled extracted peaks as one sound. In that occasion, the sound source orienting section 22 of the audition module 20 selects the sound signals of the same frequency from the left and the right channels, as shown by the mark X3, about the sound signal from each sound source, calculates IPD (Interaural Phase Difference) and IID (Interaural Intensity Difference) and outputs to the active direction pass filter 23a. On the other hand, the active direction pass filter 23a, based on the direction of the association stream 59 by the real time tracking (as mentioned below) based on the face localization, stereo vision, and sound source localization by the association module 50, utilizes an extended auditory epipolar geometry as explained later in detail, and produces the theoretical value IPD ($=\Delta\phi_E(\theta)$) of IPD, as shown by the mark X4, in the range of ±90 degrees with the front of the robot 10 as 0 degree, as well as calculates the theoretical value IID ($=\Delta\rho_E(\theta)$) of IID.

Said extended auditory epipolar geometry is explained here.

Figure 6:
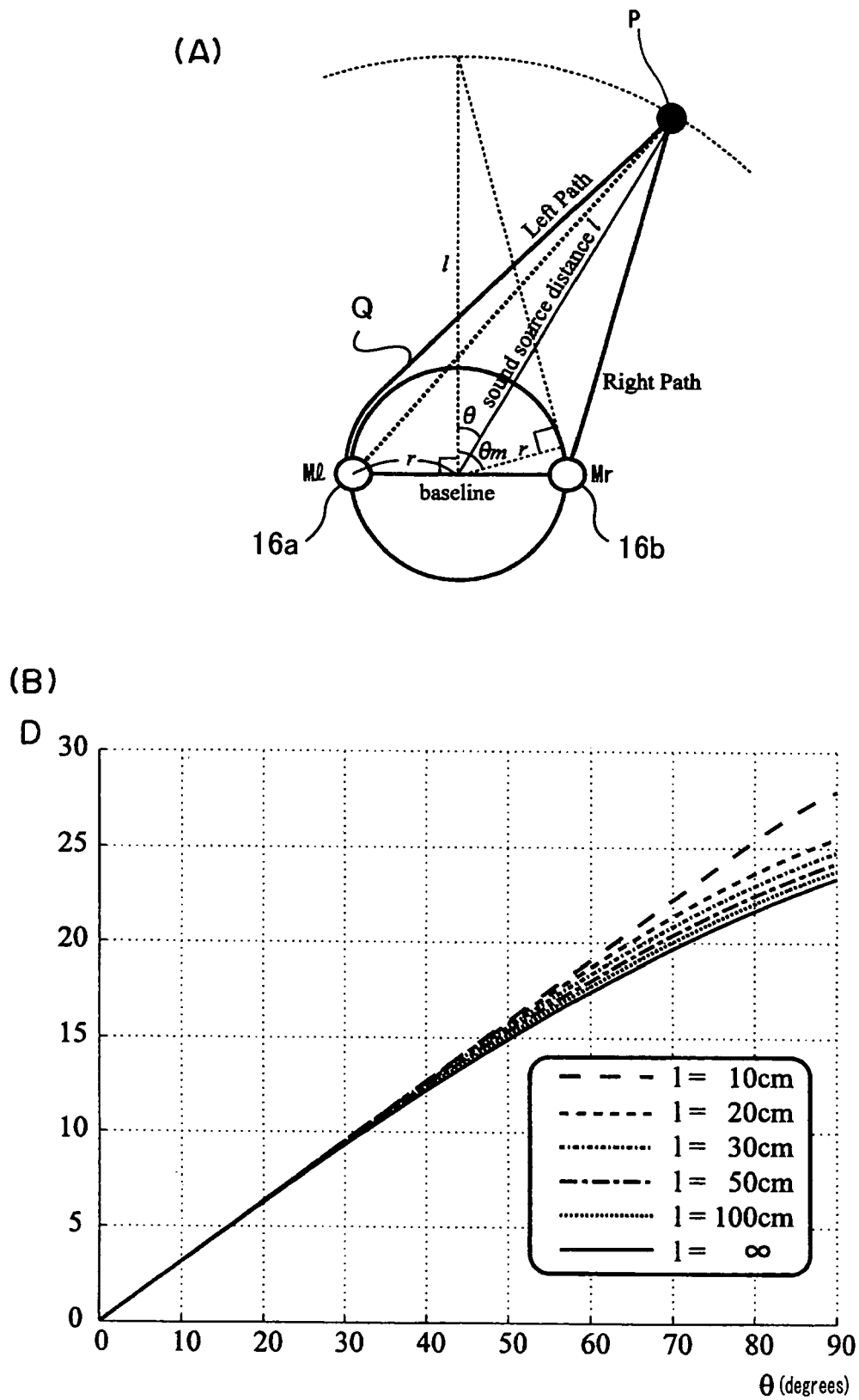
FIG. 6(A) is a diagrammatic view illustrating an extended auditory epipolar geometry in the robotics visual and auditory system shown in FIG. 4, and (B) is a graph showing a relationship between IPD and a distance from the sound source.

The auditory epipolar geometry is necessary for obtaining the directional information of the sound source without using HRTF. In the study of a stereovision, an epipolar geometry is one of the most general orienting methods, and the auditory epipolar geometry is the application to the audition of the epipolar geometry of vision. And since the auditory epipolar geometry obtains directional information by utilizing geometrical relationship, HRTF can be unnecessary. However, a conventional auditory epipolar geometry has the influences from a cladding 14, or from the environment of the real world such as the echoes from the robot 10 and the room. As for the influence from the cladding 14, when microphones 16a and 16b are provided at both sides of the real robot's head portion as shown in FIG. 6(A), if, for example, the sound source is located to the front right, the line Q connecting the left hand side microphone 16a and the sound source P penetrates through the head portion 13, but actually the sound from the sound source comes along the surface of the cladding 14 of the head portion 13, and reaches the left hand side microphone 16a. Therefore, in such a case, said auditory epipolar geometry is not applicable.

Hence according to the present embodiment, in order to more accurate directional information, the extended auditory epipolar geometry in accordance with the present invention is utilized.

The extended auditory epipolar geometry in accordance with the present invention functions as shown below. Namely, first from a pair of spectra obtained by FFT (Fast Fourier Transformation), IPD of respective sub-bands is calculated. And, the shape of the head portion 13 taken into consideration, the distance from the center of the head portion 13 to the sound source P is set as l, and the radius of the head portion as r, as shown in FIG. 6(A). And further, the difference of distance from the sound source P to the microphones at both sides 16a and 16b is set as D, IPD as $\Delta\phi$, the sound frequency as f, and the sound velocity as v (hereinafter, the sound velocity v is fixed as, for example, 340 m/sec, not variable with temperature or humidity for simplifying calculation), then the equation below is obtained.

$$\theta = D^{-1}(v/2\pi f)\Delta\phi) \quad \text{(Eq. 1)}$$

Here, for the definition of D, the influence of the robot's cladding 14 should be taken into consideration. Owing to the cladding 14, sound can reach directly one ear. For example in FIG. 6(A), since the sound path from the sound source P to the left hand side microphone 16a is not straight, the sound has to proceed along the surface of the cladding 14. Therefore, with the shape of the cladding 14 taken into consideration, the equation of an auditory epipolar geometry may be adjusted. From this, the equation of the auditory epipolar geometry becomes $$D(\theta, l) = \begin{cases} r(\pi - \theta - \theta_m) + \delta(\theta, l) & (0 \leq \theta < \frac{\pi}{2} - \theta_m) \\ r(\pi - 2\theta) & (|\theta - \frac{\pi}{2}| \leq \theta_m) \\ r(\theta - \theta_m) + \delta(\pi - \theta, l) & (\frac{\pi}{2} + \theta_m < \theta \leq \pi) \end{cases} \quad \text{(Eq. 2)}$$

-continued $$\delta(\theta, l) = \sqrt{l^2 - r^2} - \sqrt{l^2 + r^2 - 2rl\cos\theta} \quad \text{(Eq. 3)}$$

and, $$\theta_m = \arcsin\frac{r}{l}. \quad \text{(Eq. 4)}$$

Thus, D is defined as the function of θ and l. The graph of FIG. 6(B) shows the relationship of D, θ, and l obtained by simulation. From this, it is seen that the larger θ, the larger becomes the influence of l. However, when l exceeds 50 cm, the influence of l is negligible. In such a case, l assumed as infinitive, and D is defined as the function of θ only by the equation shown below.

$$D(\theta) = \lim_{l \to \infty} D(\theta, l) \quad \text{(Eq. 5)}$$
$$= r(\theta + \sin\theta)$$

Here, when the sound source is oriented by a visual epipolar geometry, D can be easily transformed to θ, since the baselines in vision and audition are parallel. This means that the directional expression is used as the gambit to unify visual and auditory information.

Also, the active direction pass filter 23a, by influence of the environment of real world mentioned above, depends upon three major factors shown below.

1. The difference in distance from the sound source to the left and the right ear portions;
2. The echoes on the robot's main body and head portion; and
3. The echo of the room.

Figure 7:
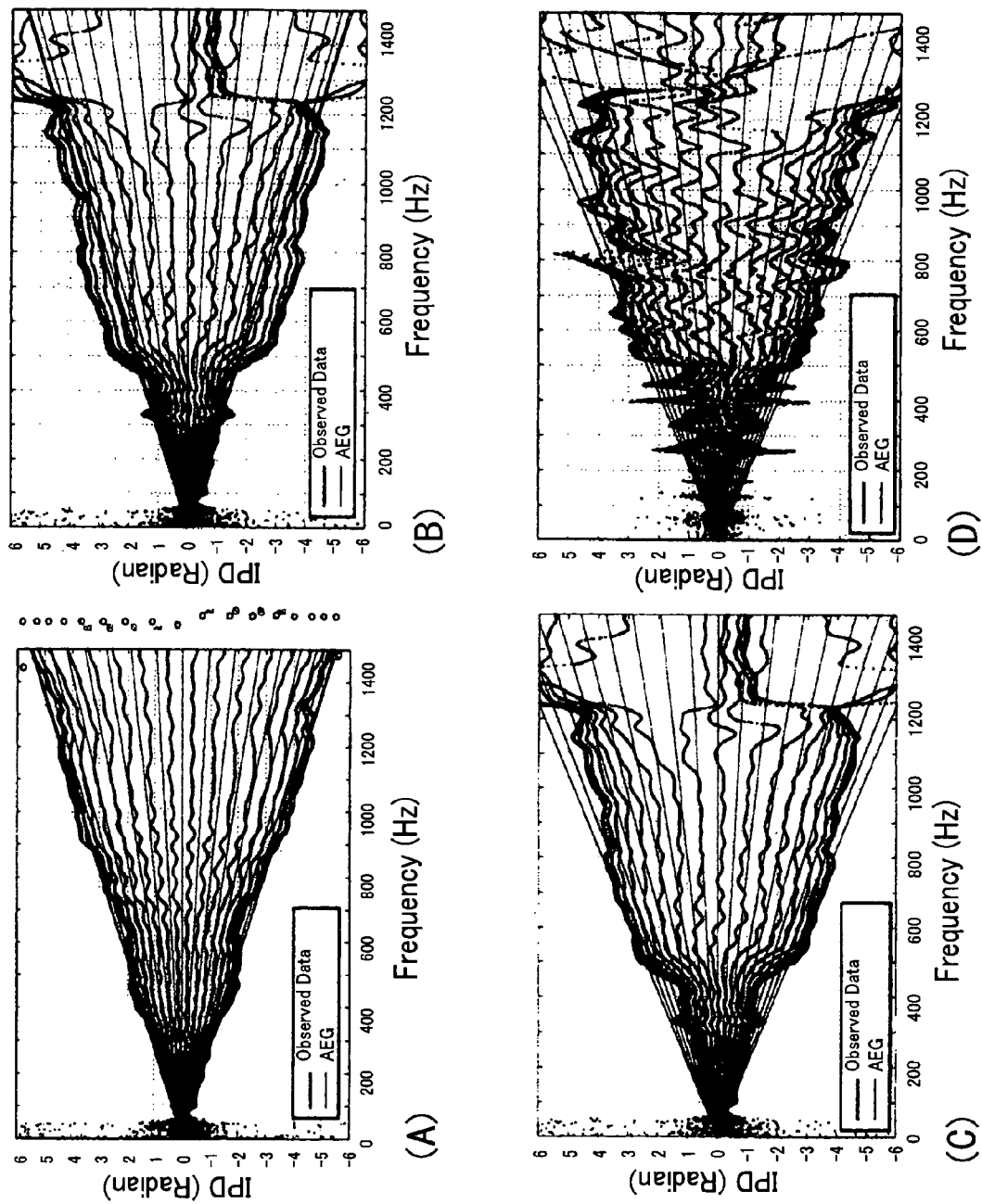
FIG. 7 is a graph showing the calculation result of IPD in the robotics visual and auditory system shown in FIG. 4.

Here, in order to examine the influence in the real world by these factors, pulse response was measured at each 10 degrees in the range of ±90 degrees to the left and the right from the front in an echoless room, and compared with the simulation by an extended epipolar geometry, then the result was obtained as shown in FIG. 7.

FIG. 7(A) shows the result of sound measurement using a stereo microphone without a cover, and hence the influence of a cover is not necessary to be considered. Here, the thin line shown by AEG shows IPD assumed by a conventional auditory epipolar geometry, and is seen to agree well with the observed result (solid line). Thereby the principle of an auditory epipolar geometry is seen to be correct. On the other hand, FIG. 7(B) shows the robot's IPD observed value (solid line) and IPD assumed by the auditory epipolar geometry (thin line) in an echoless room. In this case, the assumption by the auditory epipolar geometry does not agree with the corresponding data with the frequency of 300 Hz or higher. This disagreement was caused by the echoes on the robot's main body and head portion. Also, FIG. 7(C) shows the robot's IPD observed value (solid line) and IPD assumed by the extended auditory epipolar geometry (thin line) in an echoless room. In this case, the assumed IPD is better assumed than the case of FIG. 7(B). This suggests that the problem of disagreement by the influence of a cover was overcome by the extended auditory epipolar geometry. Further, FIG. 7(D) shows the observed value (solid line) in a non-echoless room. This room is 10 m², and sound-absorbing material is attached on the surfaces of wall, ceiling and floor. In this case, the observed IPD (thin line) was distorted by the sound effect of the room, and it is seen from the fact that the range of IPD exceeds ±π with respect to the baseline that the extended auditory epipolar geometry did not function well for the frequency of 1200 Hz or higher.

Next, the influence of the echo in a room is analyzed by BEM (Boundary Element Method) utilizing SYSNOISE (LMS International Company's software).

Figure 8:
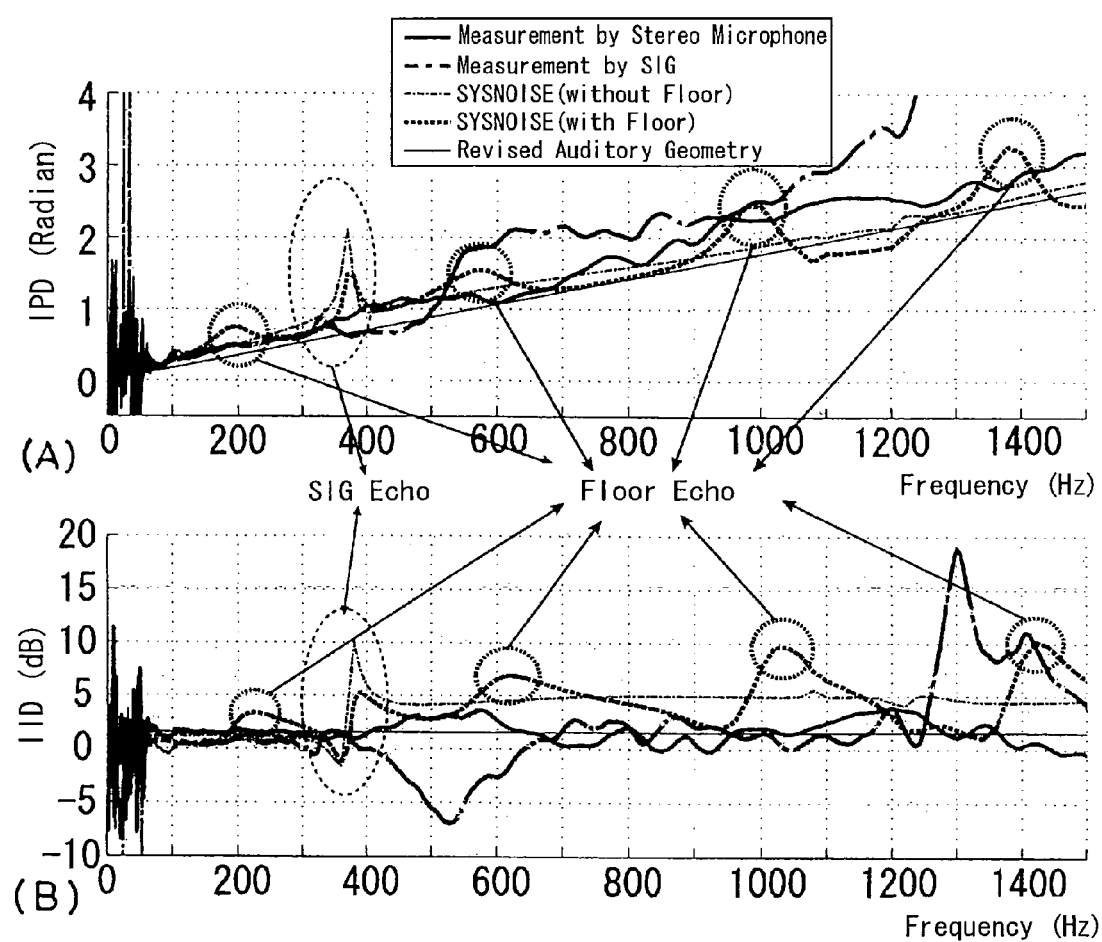
FIG. 8(A) is a graph showing the observed and the calculated values of IPD for the angle 30 degrees in the robotics visual and auditory system of FIG. 4.
FIG. 8(B) is a graph showing an observed and a calculated values of IID.

FIG. 8 shows IPD and IID at 30 degrees. Here, IPD and IID shown by SYSNOISE (floorless) are calculated using the three dimensional mesh data of a robot's head portion, and have peaks between 300 and 400 Hz. These peaks are caused by a robot's head portion. IPD and IID measured by a robot also have peaks between 300 and 400 Hz by a cover. Also, IPD and IID shown by SYSNOISE (with floor) are calculated on the condition that the floor surface is located 1 m below a robot, and have more peaks. Consequently, since even a simple floor surface causes surge of IPD and IID, sound environment needs to be considered for sound source localization.

Also, an active direction pass filter 23a, likewise based on said stream direction, utilizes Head-Related Transfer Function (HRTF), and produces IPD ($=\Delta\phi_H(\theta)$) and IID ($=\Delta\rho_H(\theta)$), the theoretical values of IPD and IID as shown by the mark X5 in the range of ±90 degrees with the front of the robot 10 as 0 degree.

Further, an active direction pass filter 23a utilizes pass range function from said stream direction as shown by the mark X7, and calculates pass range δ(θ). Here, pass range function is, as shown in FIG. 5, such a function, as the sensitivity becomes maximum in the robot's front direction (θ=0 degree), and lowers at sides, as to have minimum value at θ=0 degree, and larger values at sides. This is to reproduce the auditory characteristics that the localization's sensitivity becomes maximum in frontal direction, and lowers as the angle becomes wider to the left and the right. Here, the phenomenon that the sensitivity of the localization becomes maximum in the frontal direction is called auditory fovea after a fovea seen in the structure of a mammal's eye. As for the human being's fovea, the localization's sensitivity is about ±2 degrees in front, and about ±8 degrees at about 90 degrees at both sides.

For this reason, an active direction pass filter 23a, based on IPD ($=\Delta\phi_E(\theta)$) and IID ($=\Delta\rho_E(\theta)$) calculated for each sub-band by extended auditory epipolar geometry and IPD ($=\Delta\phi_H(\theta)$) and IID ($=\Delta\rho_H(\theta)$) obtained by HRTF, collects sub-bands in which IPD ($=\Delta\phi'$) and IID ($=\Delta\rho'$) satisfy either of the conditions shown below extracted in the angle range between the angle θ−δ(θ) (hereafter to be called $\theta_L$) and θ+δ(θ) (hereafter to be called $\theta_H$) determined by said pass range δ(θ).

Here, the preset frequency $f_{th}$ is the upper limit of the frequency for which the localization by IPD is effective, and depends upon the baseline of the head portion 13 of the robot 10, and is about, for example, 1200 to 1500 Hz.

$$f < f_{th}: \Delta\phi_E(\theta_L) \leq \Delta\phi' \leq \Delta\phi_E(\theta_H) \quad \text{Condition A.}$$

This means that sub-bands are collected when IPD ($=\Delta\phi'$) is within the range of IPD pass range δ(θ) by the extended auditory epipolar geometry with the frequency below preset frequency $f_{th}$.

$$f < f_{th}: \Delta\phi_H(\theta_L) \leq \Delta\phi' \leq \Delta\phi_H(\theta_H), \text{ and}$$

$$f \geq f_{th}: \Delta\rho_H(\theta_L) \leq \Delta\rho' \leq \Delta\rho_H(\theta_H). \quad \text{Condition B.}$$

This means that sub-bands are collected when IPD ($=\Delta\phi'$) is within the range of IPD pass range δ(θ) by HRTF with the frequency below preset frequency $f_{th}$, and IID ($=\Delta\rho'$) is within the range of IID pass range δ(θ) by HRTF with the frequency above preset frequency $f_{th}$.

All frequency $f$: $\Delta\phi_E(\theta_L) \leq \Delta\phi' \leq \Delta\phi_E(\theta_H)$   Condition C.

This means that sub-bands are collected when IPD ($=\Delta\phi'$) is within the range of IPD pass range $\delta(\theta)$ by the extended auditory epipolar geometry with all the frequency.

$f < f_{th}$: $\Delta\phi_E(\theta_L) \leq \Delta\phi' \leq \Delta\phi_E(\theta_H)$. and $f \geq f_{th}$: $\Delta\rho_H(\theta_L) \leq \Delta\rho' \leq \Delta\rho_H(\theta_H)$.   Condition D.

This means that sub-bands are collected when IPD ($=\Delta\phi'$) is within the range of IPD pass range $\delta(\theta)$ by the extended auditory epipolar geometry with the frequency below preset frequency $f_{th}$, and IID ($=\Delta\rho'$) is within the range of IID pass range $\delta(\theta)$ by HRTF with the frequency above preset frequency $f_{th}$.

And the active direction pass filter 23a produces the pass-sub-band direction by making up the wave shape from the thus collected sub-bands as shown by the mark X8, conducts filtering for each sub-band as shown by the mark X9, and extracts auditory event from each sound source by reverse frequency conversion, IDFT, as shown by the mark X10.

Thus, the audition module 20 identifies at least one speaker (speaker identification) by pitch extraction, sound source separation, and localization based on the sound signal from the microphone 16, extracts its auditory event, and transmits to the association module 50 via network.

Next, the face module 30 is explained.

Said face module 30 comprises a camera 15 as the device layer, a face detector 31, a face recognizer 32 and a face locator 33 as the process layer, a face ID and a face direction 35 as the characteristic layer (data), and a face event generator 36 as the event layer. The face module 30 detects each speaker's face by, for example, skin color extraction by the face detector 31 based on the image signal from the camera 15, searches by the face database 38 pre-registered by the face recognizer 32, and, if the corresponding face is found, recognizes said face by determining its face ID 34, as well as determines (orients) said face direction 35 by the face tracker 33.

Here, the face module 30 conducts said processing for each face, that is, recognition and localization, if a plurality of faces are detected from the image signal by the face detector 31. In this case, since the size, direction, and the brightness of the face detected by the face detector 31 often change, the face detector 31 conducts face region detection, thereby can accurately detect a plurality of faces within 200 msec by the combination of skin color extraction and the pattern matching based on correlation computation.

The face locator 33 converts the face position on the two dimensional image plane to the three dimensional space, and obtains the face position in the three dimensional space as the set of direction angle $\theta$, height $\phi$, and distance r. And the face module 30 generates the face event 39 by the face event generator 36 for each face from the face ID (name) 34 and the face direction 35, and transmits to the association module 50 via network.

Said stereo module 37 comprises a camera 15 as the device layer, a disparity image generator 37a and a target extractor 37b as the process layer, a target direction 37c as the characteristic layer (data), and a stereo event generator 37d as the event layer. By this, the stereo module 37 generates a disparity image from the image signal of both cameras 15 by the disparity image generator 37a based on the image signal from the camera 15, extracts the personal candidate, if a longitudinally long matter is detected as the result of regional division of the disparity image, identifies its direction, generates the stereo event, and transmits to the association module 50 via network.

Said motor control module 40 comprises a motor 41 and a potentiometer 42 as the device layer, PWM control circuit 43, AD conversion circuit 44, and motor controller 45 as the process layer, the robot direction 46 as the characteristic layer, and a motor event generator 47 as the event layer. By this, the motor control module 40 drive-controls the motor 41 via the PWM control circuit 43 by the motor controller 45 based on the command from the attention control module 57 (described below), as well as detects the rotational position of the motor 41 by the potentiometer 42, extracts the robot direction 46 by the motor controller 45 via the AD conversion circuit 44, generates the motor event 48 consisting of motor direction information by the motor event generator 47, and transmits to the association module 50 via network.

Next, the association module 50 is explained.

Said association module 50 is hierarchically ranked higher than said audition module 20, face module 30, stereo module 37, and motor control module 40, and constitutes the stream layer which is ranked above the event layers of respective modules 20, 30, 37, and 40. In more concrete sense, said association module 50 is provided with the absolute coordinate converter 52 which generates the auditory stream 53, the face stream 54, and the stereo stream 55 by synchronizing the asynchronous event, that is, the auditory event 28, the face event 39, the stereo event 39a, and the motor event 48 from the audition module 20, the face module 30 and the stereo module 40, the associator 56 which generates the association stream by associating respective streams 53, 54, and 55, or disassociates them, and an attention control module 57, and a viewer 58.

Said absolute coordinate converter 52 generates the auditory stream 53, the face stream 54, and the stereo stream 55 by synchronizing the motor event 48 from the motor control module 40 to the auditory event 28 from the audition module 20, the face event 39 from the face module 30, and the stereo event 39a from the stereo module 37, as well as by converting the coordinate system to the absolute coordinate system by the synchronized motor event 48 with respect to the auditory event 28, the face event 39, and the stereo event 39a. In that occasion, said absolute coordinate converter 52 generates the auditory stream 53, the face stream 54 and the stereo stream 55 by connecting to the same speaker's auditory, face, and stereo streams.

Also, the associator 56, based on the auditory stream 53, the face stream 54, and the stereo stream 55, generates the association stream 59 by associating said streams 53, 54, and 55 with their time-wise connection taken into consideration, or, on the other hand, disassociates the association stream 59 if the mutual association of the auditory stream 53, the face stream 54, and the stereo stream 55 is wakened. By this, even if the speaker to be targeted is moving, said speaker's movement can be predicted and tracked by conducting the generation of said streams 53, 54, and 55, if said speaker's movement is predicted and is within the angle range of its moving range.

Here, the formation and association of said streams are concretely conducted as described below.

As mentioned above, each event with converted coordinate is connected to the streams using algorithm based on a Kalman filter. Here, the Kalman filter is effective for reducing the influence from the process and measurement noise of localization in the auditory process having particularly big ambiguity. In the stream formation based on the Kalman filter, the position vector p of size N is approximated by the recurrence equation defined by the equation below with l as the parameter of average velocity.

$$p_{k+1} = p_k + v_k \Delta T \quad \text{(Eq. 6)}$$
$$= p_k + (p_k - p_{k-l})/l$$

When $x_k$ and $y_k$ are the state vectors expressed as $(p_k, p_{k-1}, \ldots, p_{k-l})$, and the observed values, respectively, expressed as position vectors, then the function for prediction of the process state and the observed value is defined as the equation below.

$$x_{k+1} = Fx_k + Gw_k$$

$$y_k = Hx_k + v_k \quad \text{(Eq. 7)}$$

Where if $w_k$ and $v_k$ express the process and the measurement noises, respectively, and IN is a unit determinant of the size N×N, F, G, and H are defined as shown below.

$$F = \begin{pmatrix} \frac{l+1}{l}I_N & 0\ldots & 0 & -\frac{1}{l}I_N \\ I_N & & 0 & \\ & O & & 0 \\ 0 & & I_N & \end{pmatrix} \quad \text{(Eq. 8)}$$

$$G = (I_N \ 0 \ \Lambda \ 0)^T, H = (I_N \ 0 \ \Lambda \ 0)$$

Therefore, if $\hat{x}$ is the predicted value of x, $K_k$ is the Kalman gain, P is the error codispersion determinant, $\sigma_w^2$ and $\sigma_v^2$ are the variable codispersion determinants of $w_k$ and $v_k$, the Kalman filter is defined as the equations below.

$$\hat{x}_{k|k} = \hat{x}_{k|k-1} + K_k(y_k - H\hat{x}_{k|k-1})$$

$$\hat{x}_{k+1|k} = F\hat{x}_{k|k} \quad \text{(Eq. 9)}$$

$$K_k = \hat{P}_{k|k-1}H^T(I_N + H\hat{P}_{k|k-1}H^T)^{-1} \quad \text{(Eq. 10)}$$

$$\hat{P}_{k|k} = \hat{P}_{k|k-1} - K_k H \hat{P}_{k|k-1}$$

$$\hat{P}_{k+1|k} = F\hat{P}_{k|k}F^T + \sigma_w^2/\sigma_v^2 GG^T \quad \text{(Eq. 11)}$$

The current position vector is predicted by $$\hat{y}_k = H\hat{x}_{k|k} \quad \text{(Eq. 12)}.$$

Upon generating the auditory stream 53, if the auditory stream 53 and the auditory event 28 are in the harmonic correlation, and the difference in the direction angles between $y_k$'s of said stream 53 and the auditory event 28 is within ±10 degrees, they are connected. Also upon generating the face stream 54 and the stereo stream 55, if the difference in the distance between $y_k$'s of the stream and the event is within 40 cm, and they have same event ID, then the face event or the stereo event is connected to the face stream or the stereo stream. Here, the event ID means the face ID 34 or the target ID generated by the face module 30.

And when a plurality of streams are judged as from one person, said plurality of streams are associated to one association stream. When one of the streams making up the association stream is terminated, said terminated stream is removed from the association stream, and the association module is disassociated from one or more separated streams.

Also, the attention control module 57 is to conduct attention control for the planning of drive motor control of the motor control module 40, and in that case, conducts the attention control, referring to the association stream 59, the auditory stream 53, the face stream 54, and the stereo stream 55 preferentially in this order. And the attention control module 57 conducts the motion planning of the robot 10, based on the states of the auditory stream 53, the face stream 54, and the stereo stream 55, and the presence or absence of the association stream 59, and, if the motion of the drive motor 41 is required, then transmits via network the motor event as the motion command to the motor control module 40. Here, the attention control in the attention control module 57 is based on the continuity and the trigger, tries to maintain the same state by continuity, tries to track the most interesting target by the trigger, selects the stream to be turned to the attention, and conducts tracking.

Thus, the attention control module 57 conducts attention control, control-planning of the drive motor 41 of the motor control module 40, generates the motor command 64a based on said planning, and transmits to the motor control module 40 via network. By this, in the motor control module 40, the motor controller 45 conducts PWM control based on said motor command 64a, and rotationally drives the drive motor 41 to turn the robot 10 to the predetermined direction.

The viewer 58 displays the thus generated each stream 53, 54, 55, and 57 on the server screen, and more concretely, displays by a radar chart 58a and a stream chart 58b. The radar chart 58a indicates the state of stream at that instant, the visual angle of the camera and the sound source direction as more details, and the stream chart 58b displays the association stream and the auditory and the visual streams.

The robot 10 according to the embodiment of the present invention is made up as described above, and acts as below.

For example, if a speaker outside of the vision of the camera 15 speaks to the robot 10, then the robot 10, with the microphone 16 picking up said speaker's voice, and with the audition module 20 generating the auditory event 28 accompanied by the sound source direction, transmits to the association module 50 via network. The association module 50 generates the auditory stream 53 based on said auditory event 28. In this occasion, since said speaker is not inside the vision of the camera 15, the face module 30 does not generate the face event, and the stereo module 37 neither generates the stereo event 39a. Therefore, the association module 50 generates the auditory stream 53 based only on the auditory event 28, and the attention control module 57 conducts attention control to turn the robot 10 to the speaker's direction with said auditory stream 53 as the trigger.

Thus, the robot 10 turns to the speaker's direction, and conducts so-called tracking by voice. And the face module 30 takes in the image of the speaker's face by the camera 15, generates the face event 39, and conducts the face recognition by searching said speaker's face by the face database 38, and transmits the resulting face ID 24 and its image to the association module 60 via network 70. Here, if said speaker's face is not registered in the face database 38, the face module 30 transmits this fact to the association module 50 via network.

In this occasion, the association module 50 generates the association stream 59 by the auditory event 28 and the face event 39, and, by said association stream 59, the attention control module 57 does not change its attention control, so that the robot 10 stays turning to the speaker's direction. Therefore, if the speaker moves, the robot 10 tracks the speaker by controlling the motor control module 40 by the association stream 59, thereby the camera 15 of the face module 30 can continuously take the picture of the speaker.

Thus, the robot 10 can recognize a plurality of speakers by audition and vision, based on the auditory event 28 by the audition module 20, the face event 39 by the face module 30, and the association stream 59 by the association module 50, as well as track one of the plurality of speakers, or switch to another speaker on the way.

Here, since the audition module 20 conducts the sound source localization by utilizing IPD with the extended auditory epipolar geometry using the active direction pass filter 23a, more accurate sound source localization is possible with the shape of the robot 10's head portion 13 taken into consideration.

Also, since the audition module 20 adjusts the sensitivity according to the direction θ by the active direction pass filter 23a and by pass range δ(θ), more accurate sound source separation can be conducted by setting the angle range to collect sub-bands narrower in the frontal region where more accurate sound source localization is possible, whereas setting wider at side regions.

Further, since the audition module 20 calculates IPD and IID by the active direction pass filter 23a, referring to the association stream 59 from the association module 50, accurate sound source localization and separation can be conducted when the robot 10 is moving.

Thus, in the robot 10 according to the embodiment of the present invention, since the association module 50 recognizes a plurality of speakers as targets by generating the auditory, the visual, and the association streams, with these temporal trends taken into consideration, from these directional information and the individual speaker identification, based on the auditory, the face, and the stereo events from the audition module 20, the face module 30, and the stereo module 37, in case that any event misses or becomes incapable of clear recognition, for example, the speaker becomes "invisible" by moving, then by audition, or the speaker becomes "inaudible" by not speaking, then by vision, visual and/or auditory tracking is possible for a plurality of speakers on real time.

As shown below, the action of the active direction pass filter was evaluated in the experiment below. In said experiment, said robot 10 faces one loud speaker as the sound source in a room of about 10 square m, and this loud speaker is located at the same height in the distance of about 100 cm with the robot 10's frontal direction as 0 degree. As the sound signal from the loud speaker, 20 sentences, which were read by a male and a female from the article of Mainichi Newspaper in ASJ Continuous Corpus, were used.

And four kinds of indices shown below were used for evaluation.
1. The difference in S/N ratio in the frequency band region between the input and the separated voices.
2. The signal loss between the input and the separated voices.
3. The effect of noise suppression.
4. The evaluation by specialists of sound signal processing.

The difference in S/N ratio of the first item is defined by $$R_1 = 10\log_{10}\frac{\sum_{j=1}^{n}\sum_{i=1}^{m}(|sp(i,j)| - \beta|sp_0(i,j)|)^2}{\sum_{j=1}^{n}\sum_{i=1}^{m}(|sp(i,j)| - \beta|sp_s(i,j)|)^2}, \quad (Eq.\ 13)$$

where $s_p(i, j)$, $s_{po}(i, j)$, and $s_{ps}(i, j)$ are, respectively, the original wave shape signals, the observed wave shape signal collected by the microphone 16, and the spectrum of the separated wave shape signal separated by the active direction pass filter, m,n are the numbers of sub-bands and samples, and β is the damping ratio of the magnitude between the original and the observed wave shape signals.

The second signal loss is defined by $$R_2 = 10\log_{10}\frac{\sum_{n\in S}(s(n) - \beta s_0(n))^2}{\sum_{n\in S}(s(n) - \beta s_s(n))^2}, \quad (Eq.\ 14)$$

where $s(n)$, $s_o(n)$, and $s_s(n)$ are, respectively, the original wave shape signal, the observed wave shape signal collected by the microphone 16, and the separated wave shape signal separated by the active direction pass filter, S is the assembly of samples having signals, that is, the assembly of i's which satisfies $s(i) - \beta s_o(i) \geqq 0$.

Also, the third effect of noise suppression is defined by $$R_3 = 10\log_{10}\frac{\sum_{n\in N}(s(n) - \beta s_0(n))^2}{\sum_{n\in N}(s(n) - \beta s_s(n))^2}, \quad (Eq.\ 15)$$

where $s(n)$, $s_o(n)$, and $s_s(n)$ are, respectively, the original wave shape signal, the observed wave shape signal collected by the microphone 16, and the separated wave shape signal separated by the active direction pass filter, N is the assembly of samples having noises, that is, the assembly of i's which satisfies $s(i) - \beta s_o(i) < 0$.

And the four experiments described below were conducted. Here, said $f_{th}$ was assumed as 1500 Hz.

Experiment 1.

The error in sound source localization was measured for the audition, the face, and the stereo modules when the sound source direction changed from 0 to 90 degrees.

Experiment 2.

The effectiveness of the Kalman filter was measured. In this case, two loud speakers were used, one of which was fixed in the direction of 60 degrees, whereas the other was moving repeatedly from the left to the right within ±30 degrees. And the voice from the second loud speaker was extracted by the active direction pass filter. Two kinds of sound streams by use and non-use of the Kalman filter were used as the inputs to the active direction pass filter, and the extracted voices were compared by $R_1$.

Experiment 3.

The effectiveness of the active direction pass filter under said respective filtering conditions A, B, and D was measured utilizing the indices $R_1$, $R_2$, and $R_3$. The sound source separation was conducted in cases of two speaker's simultaneous speaking and three speaker's simultaneous speaking. The first loud speaker was fixed at 0 degree. The second loud speaker was positioned at 30, 60, and 90 degrees. Upon separation of three simultaneous speeches, the second and the third loud speakers were positioned at ±30, ±60, and ±90 degrees. Said loud speakers played different speeches simultaneously with the same sound volume. The pass range function δ(θ) was at ±20 degrees to the loud speaker in the directions of 0 and 30 degrees, and ±30 degrees in the directions of 60 and 90 degrees. Here, these values were defined according to the auditory fovea to the single sound source.

Experiment 4.

One loud speaker set in the direction of 0 degree, and the other changed at 30, 60, and 90 degrees, and both simultaneously outputting voices, separation and extraction of the voices from the loud speaker in frontal direction were tried, utilizing the index of $R_3$ under the conditions A to D for collecting sub-bands of said active direction pass filter 23a.

Figure 9:
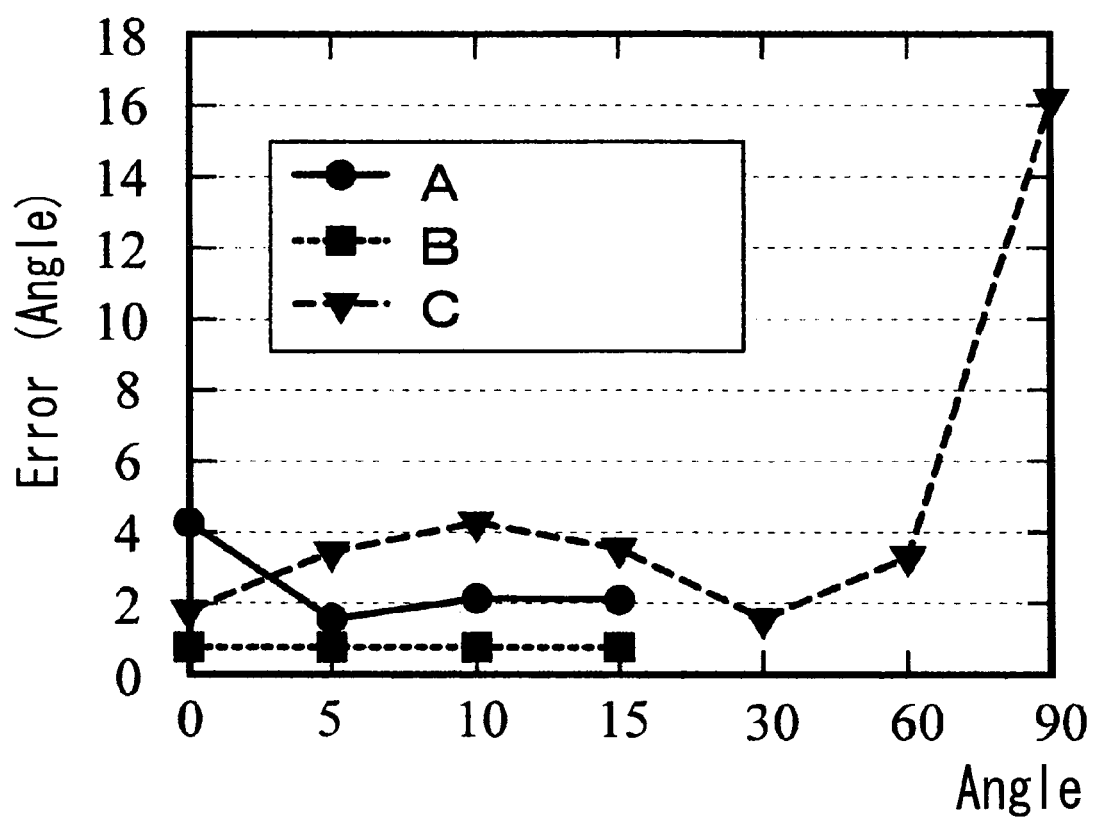
FIG. 9 is a graph showing an accuracy of sound source localization in Experiment 1 of the robotics visual and auditory system shown in FIG. 4.

According to Experiment 1, the sound source localization by the stereo module is the most accurate, as shown by the mark B in FIG. 9, and its error is within 1 degree. On the other hand, the sound source localization by the face and the audition modules is as shown by the marks A and C, respectively, as shown in FIG. 9. In general, localization by vision is more accurate than that by audition, but the audition module has the advantage as the all-directional sensor. Namely, the audition module can judge the sound direction of directional angle ±15 degrees or more. The sensitivity of localization by the audition module depends on the direction of the sound source, and is the highest in frontal direction, and its error is within ±5 degrees from 0 to 30 degrees, and is lower over 30 degrees. This fact proves the validity of the auditory fovea and the effectiveness of such motion as rotating to the front of the sound source.

Figure 10:
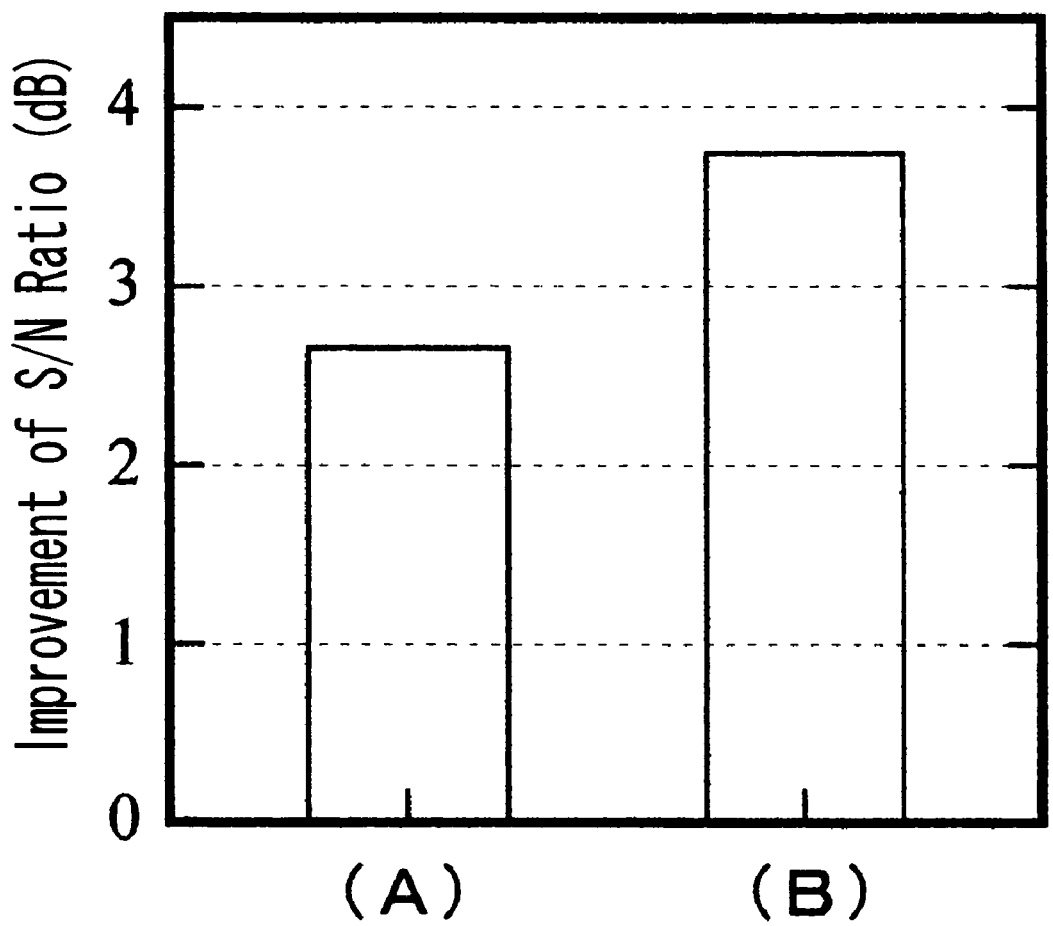
FIG. 10 is a graph showing a S/N ratio with and without a Kalman filter in Experiment 2 of the robotics visual and auditory system shown in FIG. 4.

FIG. 10 is the result of Experiment 2, and shows S/N ratio in cases of (A) without Kalman filter, and (B) with Kalman filter. It is seen from this that S/N ratio by the active direction pass filter increases by about 1 dB by the stream generation based on the Kalman filter. This indicates that Kalman filter provides better stream generation and accurate sound source direction.

FIG. 11 is the result of Experiment 3, and shows the result of sound source separation in cases of (A) two speakers' simultaneous speech, and (3) three speakers' simultaneous speech.

Similar tendency is shown for all filtering conditions. The filtering condition difference between A using the frequency below 1500 Hz and other conditions is small. This is because the sub-band by the frequency of 1500 Hz or higher collected by IID has lower power. This fact proves that the extended auditory epipolar geometry is sufficient to separate the sound source by the active direction pass filter in real environment. The indices $R_1$ and $R_3$ are the best in frontal direction, and worsen in the circumference. In the frontal direction, the effectiveness of noise suppression is about 9 dB for the three speakers' simultaneous speech. However, it is difficult to separate the speakers dose together within 30 degrees in case of the two speakers' simultaneous speech. The signal loss is 2 to 4 dB by $R_2$ in FIG. 11(A). According to two specialists in auditory signal processing, the clearest filtering condition is D. The quality of the separated sounds is good like the separation by linear microphone alley of 14 channels, or circular microphone alley of 16 channels. The evaluation by hearing indicates that the active direction pass filter has the good performance for sound source separation.

Figure 12:
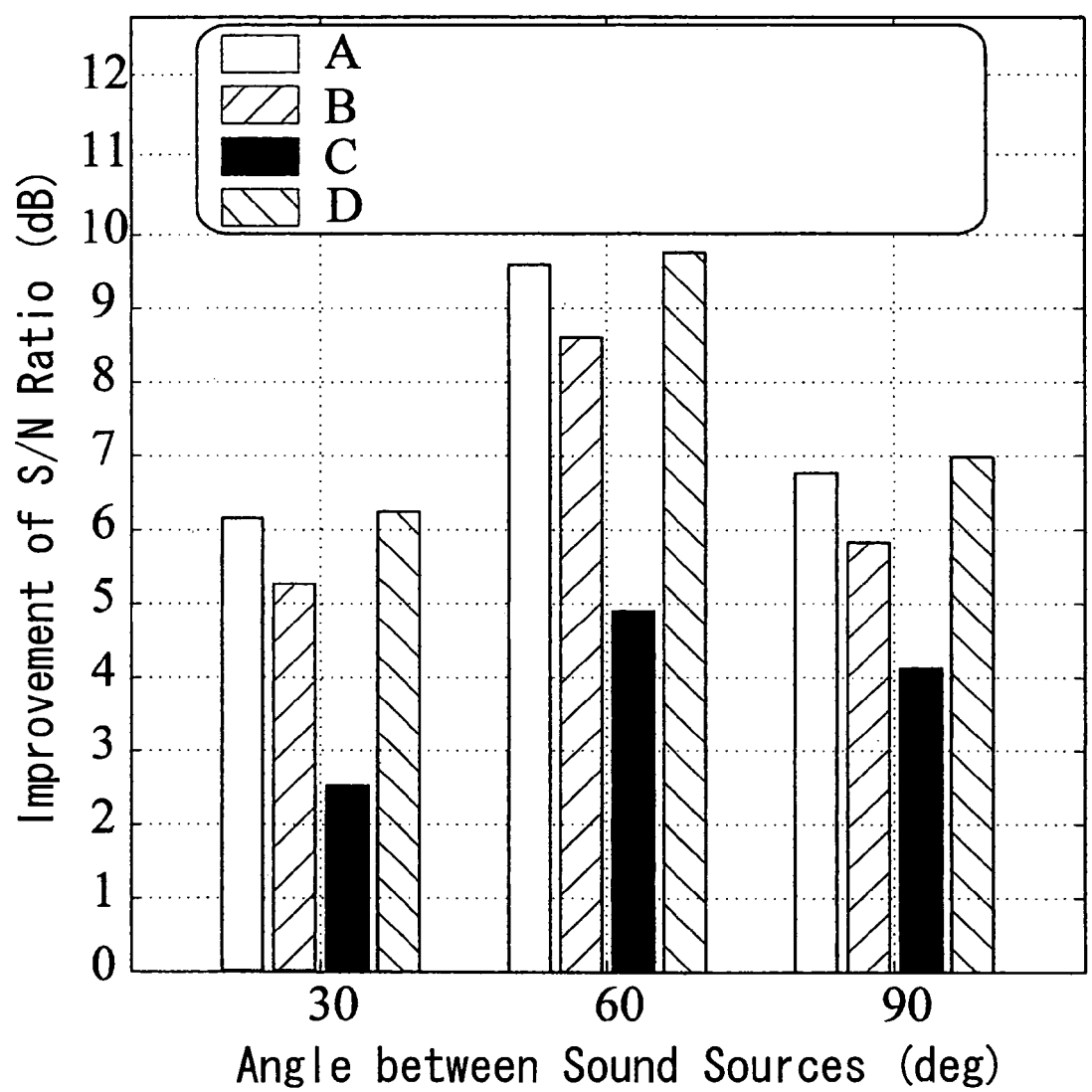
FIG. 12 is a graph showing the improvement of S/N ratio of the front speaker extraction by an audition module conditions A-D in concrete Experimental Examples of the robotics visual and auditory system shown in FIG. 4.

Further, FIG. 12 is the result of Experiment 4, and shows that condition D brought about the best sound source separation. This indicates that the efficiency of the active direction pass filter 23a is 6 to 10 dB in case of two loud speakers. The sound source localization by condition B based on HRTF is no better than that by conditions A and D based on the extended auditory epipolar geometry. This indicates the effectiveness of the extended auditory epipolar geometry for the sound source separation in the real world. In general, since the power of sub-band of the frequency of, for example, 1200 to 1500 Hz or higher collected by IID is small, the difference of sound source localization in conditions A and D is small. However, since automatic voice recognition utilizes the information from the sub-band of higher frequency, the difference of voice recognition ratio in case of automatic voice recognition is expected to be larger. Therefore, in case of condition C, the most sub-bands are collected of 1500 Hz or higher by restriction of the baseline between both ear portions of the robot 10. Consequently, the improvement in sound source localization is not so big.

According to the embodiment described above, a humanoid robot 10 is so constituted as to have 4DOF (degrees of freedom), but not limited as such, the robotics auditory system of the present invention can be built into the robot constituted to conduct arbitrary motion. Also, according to the embodiment described above, explanation was made of the case in which the robotics visual and auditory system of the present invention was built into a humanoid robot 10, but not limited as such, it is obviously possible to build into such various animaloid robots as a dog type and others, or to other types of robots, and here a robot is the concept to include widely industrial automatic control devices and others.

INDUSTRIAL APPLICABILITY

As described above, in the present invention, since each speaker's direction is determined based on such directional information as sound source localization by the auditory stream and speaker localization by the visual stream by association of the audition, the visual, and the motor control modules with the association and the attention control modules, the ambiguities respectively possessed by a robot's audition and vision are mutually complemented, so-called robustness is improved, and hence each speaker can be surely recognized even for a plurality of speakers. Also in case, for example, that either one of auditory and visual streams lacks, since the attention control module can track the object speaker based only on the remaining visual stream or auditory stream, accurately grasping the direction of the target and controlling the motor control module can be effected.

Consequently, according to the present invention, an extremely superb robotics visual and auditory system is provided, which, by associating the visual and the auditory information with respect to a target, accurately conducts the sound source tracking of a target.

What is claimed is:

1. Robotics visual and auditory system comprising:
    an audition module including at least a pair of microphones for collecting external sounds;
    a face module including a camera for taking images in front of a robot;
    a stereo module for extracting a matter by a stereo camera;
    a motor control module including a drive motor for rotating the robot in the horizontal direction;
    an association module for generating streams by associating events from said audition, said face, said stereo, and said motor control modules; and
    an attention control module for conducting attention control based on the stream generated by said association module; characterized in that:
    said audition module determines at least one speaker's direction from the sound source separation and localization by grouping based on pitch extraction and harmonic wave structure, based on sound signal from the microphones, and extracts a auditory event;
    said face module identifies each speaker from each speaker's face recognition and localization based on the image taken by the camera, and extracts a face event;

said stereo module extracts a stereo event by extraction and localization of a longitudinally long matter based on a disparity extracted from the image taken by the stereo camera;

said motor control module extracts a motor event based on the rotational position of the drive motor; and thereby said association module determines each speaker's direction based on directional information of sound source localization by the auditory event, face localization by the face event, and matter localization by the stereo event from the auditory, face, stereo, and motor events, generates a auditory, a face, and a stereo streams by connecting the events in the temporal direction using a Kalman filter, and further generates a association stream by associating these;

said attention control module conducts attention control based on said streams, and drive-control of the motor based on a result of planning for the action accompanying those; and said audition module collects sub-bands having interaural phase difference (IPD) or interaural intensity difference (IID) within a predetermined range by an active direction pass filter having a pass range which, according to auditory characteristics, becomes minimum in the frontal direction, and larger as the angle becomes wider to the left and right, based on an accurate sound source directional information from the association module, and conducts sound source separation by restructuring a wave shape of a sound source.

2. Robotics visual and auditory system as set forth in claim 1, characterized in that said audition module conducts sound source separation based on the sound source localization by an extended auditory epipolar geometry.

3. Robotics visual and auditory system as set forth in claim 2, characterized in that;
said audition module conducts the sound source separation based on the sound source localization each obtained;
by the extended auditory epipolar geometry, with the robot's proper preset frequency as standard, for the frequency below said preset value;
by head-related transfer function (HRTF) in all frequency band region;
by the extended auditory epipolar geometry in all frequency band region; or
by the extended auditory epipolar geometry for the frequency below the preset value, and by the head-related transfer function for the frequency above the preset value.

4. Robotics visual and auditory system as set forth in any one of claims 1 to 3, characterized in that said association module, after determining each speaker's direction, generates the auditory, the face, and the stereo streams by connecting the events in the temporal direction using the Kalman filter, and further generates the association stream by associating these.

5. Robotics visual and auditory system as set forth in claim 1, characterized in that said audition, face, stereo, motor control, association, and attention control modules are mutually connected via network, and the network of relatively high speed is used for the communication of the events or the streams of particularly large data volume.

* * * * *